UNITED STATES PATENT OFFICE 2,676,135

METHOD OF PRODUCING MODIFIED VIRUS OR VACCINE

Arthur L. Brueckner, Hyattsville, and Reginald L. Reagan, Silver Spring, Md., assignors to The University of Maryland, College Park, Md.

No Drawing. Application January 17, 1952, Serial No. 267,002

3 Claims. (Cl. 167—78)

1

This application is a continuation-in-part of our copending application Serial Number 791,148, filed December 11, 1947, now abandoned.

This invention relates to a modified virus or vaccine for use in immunizing fowls, particularly chickens, against Newcastle disease. This disease, also known as pneumoencephalitis in the United States and in other English speaking countries and under various other names in other parts of the world, has been introduced into the United States in recent years. Extensive studies where the disease is known prove that the causative agent is a filter passing virus. The main symptoms are those arising from the effects of the virus upon the respiratory and central nervous systems. There are generally difficult breathing, with wheezing, sneezing and coughing, and discharges from nostrils and mouth; loss of appetite; dullness, weakness of one or both legs followed by paralysis; drooping of wings followed by paralysis; abnormal positions of the head and neck; and complete prostration. The death rate observed in flocks in the United States has been variable, ranging up to 50% or more. There is probability of greater death rate, since, in other countries, the mortality has reached 100%.

Some work has been done heretofore in an an effort to develop a vaccine for effectively immunizing chickens against Newcastle disease. Work in the Philippines with a killed or inactivated vaccine has been described by Aceveda and Mendoza. Others who have described investigations of the effectiveness of killed vaccine in connection with the treatment or prevention of Newcastle disease were Nakamura and Wagtsuma in Japan; and Beach in California. Haddow and Idnani described tests made with a temperature-attenuated vaccine for vaccination against "Ranikhet disease," the name by which Newcastle disease is known in India. Komarov and Goldsmit (Palestine) published a preliminary observation on the modification of a strain of Newcastle disease virus by intracerebral passage through ducklings. Generoso and Aceveda described the cultivation of avian pest virus in the embryos of chickens. So far as we know, none of the vaccines heretofore provided have been effective to the point of immunizing a large percentage of vaccinated chickens against Newcastle disease.

An object of the present invention is to provide an improved vaccine for immunizing chickens against Newcastle disease.

Another object of the invention is to provide

2 an improved method of producing such a vaccine.

Another object of the invention is to prepare from the virus of Newcastle disease, a modified virus, or vaccine, capable of immunizing chickens against the disease, and which modified virus or vaccine is non-pathogenic or has a low degree of pathogenicity.

We have discovered that by passing a virus of Newcastle disease serially through hamsters (small mammals native to Syria and not commonly known in America), the virus may be so modified that it may be used safely, while still alive, for effectively immunizing chickens against Newcastle disease. The virus, now known as California strain 11914, used was obtained from the Bureau of Animal Industry, United States Department of Agriculture, Washington, D. C.

The serial transmission through hamsters was accomplished by inoculating hamsters intracerebrally with the live aforementioned virus, then preparing a suspension of the ground brains of hamsters which died or become ill as a result of the injection, and then injecting other hamsters intracerebrally with the suspension. This procedure was carried on serially for a plurality of passages in accordance with the well known or standard methods of modifying a virus by adaptation to a host. Tests were made by vaccinating healthy chickens with the hamster-adapted vaccine and then challenging unvaccinated control chickens and chickens vaccinated with vaccine modified by different numbers of passages through hamsters. It was found that the virus, thus modified by seventeen passages through hamsters, is useful for providing effective immunization, but is sufficiently pathogenic to not be most advantageous for all uses. Highly effective immunization with lower pathogenicity was obtained with the hamster adapted Newcastle virus of the twenty-ninth and the forty-ninth passages, the forty-ninth passage product having the lowest pathogenicity.

In general, the preparation of the modified Newcastle disease virus vaccine in accordance with our invention is somewhat analogous to known procedures, for example, the preparation of smallpox vaccine by the modification of human smallpox virus by serial passage through rabbits or calves. However, it is not possible to predict that a particular virus can be modified in this manner; and even if the adaptability to serial passage modification is assumed, it is not possible to foresee what animal or fowl could serve as the host.

In the preparation of our improved vaccine, each of several hamsters was injected intracerebrally with one-tenth of 1 cc. of allantoic fluid infected with the live Newcastle disease virus referred to. Symptoms of irritability and malaise appeared three to six days after inoculation. During the moribund period, the animals showed labored breathing and moved only slightly when disturbed. The hamsters from which brain material was used for passage were sacrificed while moribund; and a ten percent brain suspension was prepared by grinding the brain tissue with alundum and diluting with physiologic saline. Thereafter, eight hundredths to one-tenth cc. of brain suspension was passed serially through hamsters.

One-half cubic centimeter of a 10 percent infected brain suspension of the seventeenth passage of the aforementioned virus was injected into the base of the wattle of each of a group of six-week-old chickens. Nine days after inoculation, one-fourth of the injected chickens showed typical Newcastle disease symptoms. The remaining chickens appeared normal for thirty days after inoculation. On the thirtieth day after inoculation, they were challenged with 0.2 cc. of a $10^{-4}$ dilution of a virulent egg-adapted strain of the virus, which titred $10^{-8}$ in ten-day embryonated eggs. The virus also titered $10^{-8}$ in young chickens six weeks old. Another group of chickens of the same age as those injected with the hamster-adapted Newcastle virus were used as controls. Both groups, the vaccinated group and the control group were challenged with the same amount, that is, 0.2 cc. of $10^{-4}$ dilution of the egg-adapted virus. No characteristic symptoms of Newcastle disease appeared in the vaccinated group within an observation period of a month after the day of challenge. All of the chickens of the control group died of Newcastle disease symptoms on the fourth and sixth days after challenge. The vaccine produced from the hamster-adapted virus of the seventeenth passage, although having a substantial pathogenicity, can be used to advantage in protecting major portions of flocks endangered by an unusually severe epidemic, since without such protection substantially entire flocks could succumb to the disease.

Further investigations with chickens inoculated with the hamster-adapted virus of the twenty-ninth and the forty-ninth passages were conducted. One hundred fifty healthy, twelve week old chickens, which had no history and had showed no indication of infection with Newcastle disease, were used for the first two large scale tests. Forty-two of these chickens, to be referred to as "Group I," were injected at the base of the wattle with .5 cc. of a 10 percent suspension of infected hamster brain of the twenty-ninth passage. Eight uninjected chickens were kept with this group as room controls. About one week after injection, four of the inoculated chickens showed symptoms typical of Newcastle disease. Two died within forty-eight hours of injection and were considered atypical. The pathogenicity of the twenty-ninth passage virus was thus about 9 percent, on the basis of typical symptoms. All of the room controls survived and were still healthy twenty-eight days after injection.

On the twenty-eighth day after injection, the room controls and the thirty-six surviving test birds were challenged with .2 cc. of virulent challenge virus injected into the base of the wattle. Concentrations of the challenge virus for each of three sub-groups of twelve surviving chickens of Group I were $10^{-2}$; $10^{-3}$; and $10^{-4}$. Challenge virus titration established a concentration of $10^{-2}$ as that which would cause death of fifty percent of susceptible chickens. Following the challenge, two of the birds previously vaccinated with the hamster-adapted Newcastle virus, twenty-ninth passage, died. Thirty-four (94.5 percent) of the vaccinated birds survived.

A similar test was made with a second group of fifty chickens, forty-two being vaccinated with twenty-ninth passage hamster-adapted Newcastle virus, and the other eight being kept with the vaccinated birds as room controls. The times of administering, and the size and concentration of the dosages were the same as in the Group I tests, but the vaccinations were made in the breast muscles instead of the wattles. The challenge was the same as the Group I challenge. The Group II results were the same as the Group I results with the exception that four, instead of two, of the vaccinated birds succumbed to the challenge.

Thirty chickens of the original flock of one hundred fifty were used as non-contact controls, i. e., were kept separate from the chickens of Groups I and II, but were challenged in the same manner as the Groups I and II vaccinated and room control chickens. Of the thirty non-contact controls, only three, or 10 percent survived the challenge. The room control birds kept in contact with the Groups I and II vaccinated birds showed no evidence of Newcastle disease during the twenty-eight day period prior to challenging the test birds. This shows clearly that the modified virus or vaccine does not create, in vaccinated birds, a disease transmissable clinically to non-vaccinated healthy birds by contact with vaccinated birds. On the contrary, contact of the healthy unvaccinated room control birds with the vaccinated birds apparently produced a measurable resistance to the challenge, as shown by the fact that 62.5% of the challenged room control birds survived, whereas only 10 percent of the normal, healthy, unvaccinated birds used as non-contact challenge controls survived.

The remaining twenty of the flock of one hundred fifty chickens used in the tests referred to above were employed for titration of challenge virus.

Still better results, particularly as to lower pathogenicity, are obtainable with a vaccine comprising hamster-adapted Newcastle disease virus of passages beyond the twenty-ninth passage. In a representative further test in which hamster-adapted Newcastle disease virus of the forty-ninth passage was used, thirty chickens were injected in the wattle with .5 cc. of the vaccine, thirty-seven chickens were similarly injected with .25 cc., and thirty-seven chickens were injected similarly with .1 cc. Of this entire Group III of one hundred four vaccinated test birds, 1.9 percent developed typical Newcastle disease symptoms prior to being challenged. About 90 percent of the challenged vaccinated birds survived a heavy challenge. Only twenty-five percent of the challenged room controls and 3 percent of the non-contact controls challenged with the same dose as the Group III vaccinated test birds survived the challenge. The concentrations of the challenge doses were the same as used in the Groups I and II tests, but the size of the dose was .25 cc., somewhat larger than the .2 cc. challenge dose used in the Groups I and II tests.

Vaccine produced from the allantoic fluid of chick embryos injected with forty-ninth passage hamster-adapted Newcastle virus was injected into ninety-three chickens of Group IV. These chickens were obtained from a source other than the source of the Groups I, II, and III test chickens and the chickens of a fifth group to be referred to later. It was observed, before making the tests, that the Group IV test chickens were not as healthy as the other test chickens. Ninety-two per cent of the challenged vaccinated test chickens of Group IV survived the challenge; but the pathogenicity of the Group IV vaccine was somewhat higher than that of the hamster-adapted virus vaccine used in the testing of the birds of Groups I, II and III. Only 40 per cent of the challenged room controls and 3 per cent of the non-contact controls challenged with the same dose as the Group IV vaccinated birds survived the challenge. The vaccine used in the Group IV tests was prepared by inoculating eleven day old embryonated eggs with .1 cc. of the 10 per cent hamster brain suspension, incubating the eggs at 37° C. for three days, and pooling the allantoic fluid from embryonated eggs which appeared sluggish. This fluid titered $10^{-7}$ in eleven day embryonated eggs. A 10 per cent suspension of the allantoic fluid was used for vaccinating the Group IV test birds in the wattles, fifty-one birds being vaccinated with .5 cc., and forty-two birds with .25 cc. of the vaccine.

Another vaccine was produced from a sheep brain suspension prepared by injecting a ewe intracerebrally with 5 cc. of 10 per cent hamster-adapted Newcastle virus of the thirty-sixth passage. On the eighth day after inoculation the sheep became moribund. Shortly after its death the brain was removed and 10 per cent suspension was prepared with physiological saline. This suspension, which titrated $10^{-2}$ in hamsters, was used for vaccination of ninety chickens of Group V, forty chickens being injected in the wattle with .5 cc., and fifty in the wattle with .25 cc. The pathogenicity of the sheep brain suspension vaccine was nil, but the immunizing properties were not as potent as those of the vaccines used in the tests of the Groups I, II, III, and IV chickens. Nevertheless, considerably more than 50 per cent of the Group V vaccinated test birds survived the heavy challenge, whereas only 25 per cent of the challenged room controls and about 3 per cent of the challenged non-contact control birds survived the challenge. The challenge was the same as the Group IV challenge.

Hamster-adapted Newcastle disease virus vaccine is effective for immunization against contraction of the disease from contact with infected chickens as well as for protecting or immunizing against a challenge dose administered by injection. Twenty-eight days after vaccination of the test chickens of Groups III and V, and before any of these chickens were challenged by injection, twenty-three of the vaccinated chickens were placed with twenty-two normal, non-infected and unvaccinated chickens, and twenty unvaccinated chickens which had been infected with Newcastle disease. The twenty infected chickens were being used at this time for challenge virus titration of $10^{-1}$ and $10^{-2}$ dilutions. The twenty-three vaccinated chickens included five from Group III vaccinated with .5 cc. of hamster-adapted virus of the forty-ninth passage, five from Group III vaccinated with .25 cc. of the same vaccine, five from Group V vaccinated with .5 cc. of the Newcastle modified virus sheep brain suspension, and eight vaccinated with .25 cc. of the sheep brain suspension vaccine. None of the vaccinated chickens showed symptoms of Newcastle disease, whereas within twenty-one days after exposure to the twenty infected chickens, nine of the twenty-two unvaccinated and originally uninfected chickens showed typical Newcastle disease symptoms.

The unvaccinated room control chickens were exposed to the vaccinated chickens of all of Groups I, II, III, IV, and V until the day of challenge, but none of these control birds developed Newcastle disease prior to the challenge injection.

Newcastle disease virus modified by serial passage through hamsters in accordance with the present invention may be used in accordance with standard methods for the commercial manufacture of vaccines. The specific procedures described above are intended to be understood as representative of, rather than definitive of the invention.

We claim:

1. In a method of modifying California strain 11914 Newcastle disease virus for the production of a vaccine capable when injected into chickens, of immunizing them against the disease; inoculating a hamster with said virus; obtaining the virus in modified state from the brain of said hamster; and serially passing the modified virus through the brains of other hamsters for not less than twenty-nine passages.

2. In a method of modifying California strain 11914 Newcastle disease virus for the production of a vaccine capable when injected into chickens, of immunizing them against the disease; inoculating a hamster with said virus; obtaining the virus in modified state from the brain of said hamster; and serially passing the modified virus through the brains of other hamsters for not less than forty-nine passages.

3. In a method of modifying California strain 11914 Newcastle disease virus for the production of a vaccine capable when injected into chickens, of immunizing them against the disease; inoculating a hamster with said virus; obtaining the virus in modified state from the brain of said hamster; and serially passing the modified virus through the brains of other hamsters for not less than seventeen passages.

References Cited in the file of this patent

UNITED STATES PATENTS

| Number | Name | Date |
| --- | --- | --- |
| 2,136,131 | Green | Nov. 8, 1938 |
| 2,271,819 | Green | Feb. 3, 1942 |

OTHER REFERENCES

Beveridge: "The Cultivation of Viruses and Rickettsiae in the Chick Embryo," London, 1946, page 58.

Brandley et al.: Am. J. Vet. Res., vol. 7, pp. 298, 304, 305, 307 to 322, July 1946.

Zinsser's Textbook of Bacteriology (1948), page 806.